United States Patent Office 3,548,013
Patented Dec. 15, 1970

3,548,013
PROCESS FOR THE PRODUCTION OF ALCOHOLS
Robert J. Rosscup, Valparaiso, Ind., and Alex Zletz, Chicago Heights, and Luke A. Schaap, South Holland, Ill., assignors to Standard Oil Company, Chicago, Ill., a corporation of Indiana
Filed June 30, 1966, Ser. No. 561,836
Int. Cl. C07c *29/04*
U.S. Cl. 260—641                                    7 Claims

ABSTRACT OF THE DISCLOSURE

Liquid phase high pressure hydration of $C_3$ to $C_6$ olefins to produce the corresponding alcohols, and high pressure recovery of products including recycle of excess water.

---

This invention relates to a process for the production of $C_3$ to $C_6$ alcohols from the corresponding olefin hydrocarbons, and more particularly to an improved mode of carrying out such process.

Direct catalytic hydration of olefins to the corresponding alcohols has been shown to have advantages over indirect hydration. However, the alcohol is dilute because excess water must be fed with the olefin to the reactor to prevent polymerization on the catalyst and to favor more complete conversion of olefin. Furthermore, olefin is not completely converted because equilibrium limits the extent of reaction. The effluent from the reactor therefore, contains alcohol, olefin and large amounts of water.

Various methods have been used to remove the water from the effluent to produce an alcohol concentrate. Many of these prior methods have involved separation of the water from the alcohol and disposition of the water. This is undesirable for the following reasons: the water often contains some alcohol and therefore disposition of such water is costly in that desired product is being wasted; or expensive and time-consuming steps are performed at ambient or near ambient pressures to isolate as much of the alcohol from the water as possible, and in high pressure reactions, if the water is not discarded it is expensive to recycle unconverted water after fractionating the product at ambient pressure, due to the large expenditures of compression energy. In addition, large quantities of water feed are necessary for the reaction if such recycling step is not done. The foregoing prior processes possess many disadvantages which make them unattractive for commercial operation.

Figure 1:
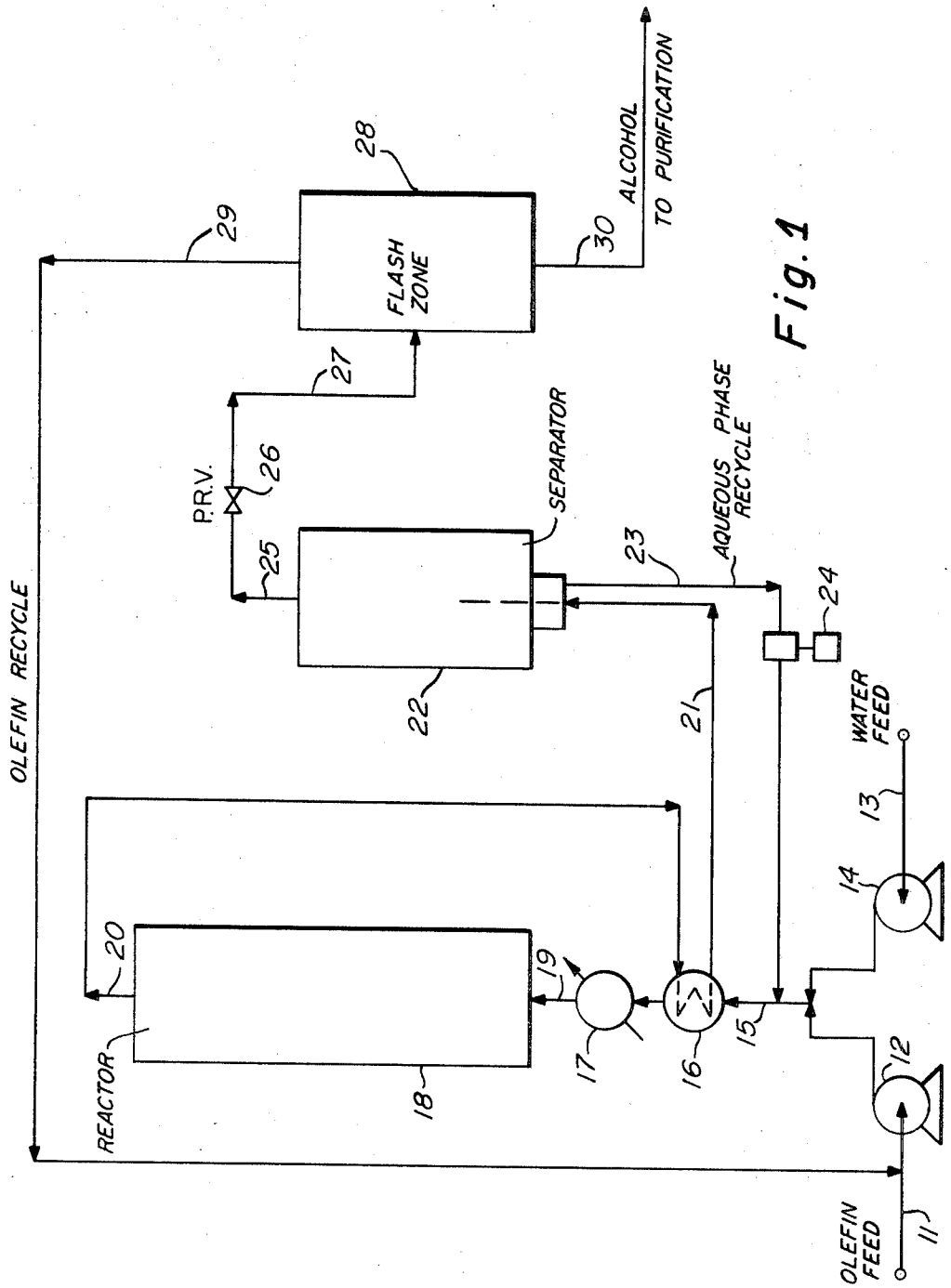
Figure 2:
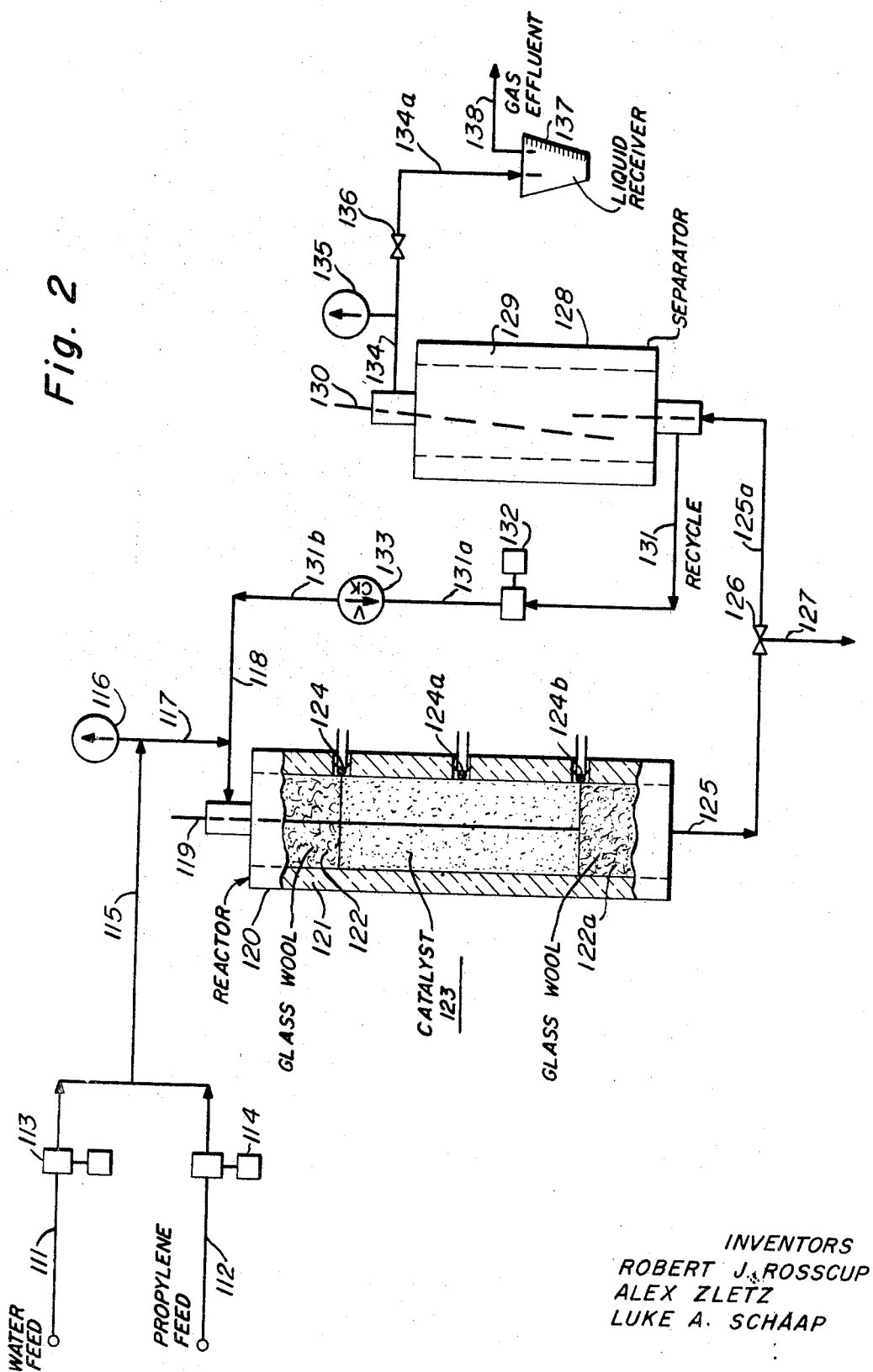

In the accompanying drawings, FIGS. 1 and 2 are schematic flow diagrams specifically illustrating the process of this invention.

We have now discovered a process for the preparation of $C_3$ to $C_6$ alcohols from the corresponding olefin hydrocarbons, which process has none of the above-mentioned disadvantages. Very briefly, the process of this invention comprises catalytically hydrating a water-$C_3$ to $C_6$ olefin hydrocarbon mixture in a reaction zone under high pressure conditions, forming a water-rich phase and an organic-rich phase, and recycling under the high pressure conditions, the water-rich phase back into the reaction zone. The effluent from the high pressure direct hydration of olefin hydrocarbon may be cooled by heat exchange and sent to a separator. In the catalytic hydration of the water-olefin mixture the reaction product separates into two phases: the upper phase contains the unconverted olefin with nearly all of the alcohol plus a small amount of water, and the lower phase contains water with a small amount of alcohol. The lower water phase is removed and recycled to a reactor while the olefin-rich phase is depressured and the components purified, as for example, by fractionation. The recovered olefin is recycled to the reactor and the alcohol is used as such or further fractionated. When the reactor feed contains alkane in the olefin, the olefin-alkane mixture from the final separation is sent to the feed fractionating unit.

It may be desirable to make use of high pressure adsorption prior to fractionation of the upper phase. This has the advantage of recovering the olefin at high pressure. If this is done the upper phase is sent to high pressure adsorption towers to remove the water and alcohol from the olefin which is recycled to the reactor. The alcohol and water are recovered from the adsorption, together or separately, by passing suitable desorbents through the tower, as for example, hot flue gas or a hydrocarbon stream, or by evacuation of the adsorbents while heating.

More specifically, the process comprises contacting in a catalytic zone a wholly liquid phase water-olefin mixture at a temperature in the range of 200 to 550° F. and a pressure in the range of 2,000 to 100,000 pounds per square inch, with a suitable catalyst, separating the resulting alcohol-rich phase from the water-rich phase in a separation zone, purifying the alcohol in the alcohol-rich phase, and recycling the water-rich phase to the catalytic zone.

A preferred mode of operation is as follows: $C_3$ to $C_6$ olefin and water, in the mole ratio of between 0.25 and 25 moles of water per mole of olefin, advantageously between 1 and 15, is contacted in a catalytic zone, at a temperature in the range of 200 to 550° F., advantageously 300 to 500° F., and a pressure in the range of 2,000 to 100,000 p.s.i. in the presence of a catalyst, the particular catalyst and olefin will determine the optimum temperature. The following catalysts are suitable: silica-alumina catalyst, preferably comprising 10 to 30 percent alumina and 90 to 70 percent silica by weight in substantially uniform composition; silica-magnesia, acidic clays, reduced tungsten oxides, acidic organic ion exchange resins and the like, such as Amberlyst 15 (polystyrene divinyl benzene sulfonic acid resin), sulfonic acids, phosphonic acids, etc. The hydration reaction may be carried out at weight hourly space velocity of 0.1 to 20 parts of said water-olefin mixture per part of catalyst by weight. The reaction products are then removed from the catalytic zone, while maintaining reaction pressures, after which the products are passed to a separation zone, which is maintained at reaction pressure and at a temperature which may be in the range of from ambient to reaction temperature, but which is preferably below reaction temperature. In the separation zone the products form an upper organic-rich phase and a lower aqueous-rich phase, and the lower phase is recycled to the catalytic zone with the application of heat to a temperature for the particular reaction. The upper phase is then drawn off, depressured to a pressure in the range of 0 to 50 atmospheres, preferably 1 to 10 and transferred to a flash zone which may be a simple distillation column or a drum. This is done to remove the unconverted olefin which may have been present in the product. The olefin is compressed and heated during recycle to the catalytic zone. The alcohol is drawn off from the bottom of the flash zone and may be used as such or further purified, as for example by distillation, adsorption, extraction, etc.

It is desirable that the depressurization of the upper phase after removal from the separation zone be as limited as possible. In other words, it is preferred to maintain the upper phase at the highest pressure which allows unconverted olefin to flash off. This is desirable since the olefin should be recycled and introduced into the catalytic zone at the high pressures originally required in the reaction. The limitation then, on the uppermost limit of the pressure will be related to the particular olefin used.

In performing the process of this invention it may be desirable that the separation zone not be removed from the reaction zone, i.e. the reaction zone may comprise a catalytic zone and a separation zone. If such a system is used, alcohol may be drawn off and purified. It is usually advantageous however to provide a separation zone which is removed from the catalytic or reaction zone.

Compositions of the phases in the separator must be distinguished from the compositions of product that appears after flashing the olefin. If insufficient organic layer is formed in the separation zone for the rate of withdrawal, aqueous phase will also be removed and the concentration of alcohol in the product will be deceptively low.

Operating parameters need be carefully adjusted to achieve operation where sufficient organic phase is formed so that no aqueous phase is removed. Make-up water, water recycle, olefin feed rate, total space velocity and product withdrawal all control both conversion to alcohol and ratio of phases formed in the separator for a given pressure, temperature and catalyst.

If the ratio of make-up water, recycle water and space velocity are too great for the amount of olefin pumped, a small amount of organic phase will be formed and aqueous layer may also be withdrawn and collected with the organic layer. If insufficient water is pumped to compensate for that consumed in making alcohol and if ratio of olefin pumped is high, the total aqueous phase decreases in volume; the amount of organic phase increases and builds up in the separation zone. Thus, it is evident that feed and recycle parameters require careful adjustment to achieve an over-all steady state operation.

The separator temperature is also an important factor. The choice of temperature will depend upon the critical conditions for the particular olefin feed. Generally, higher temperature leads to a decrease in alcohol to water ratio, i.e. selectivity for alcohol, hence as low a temperature as feasible should be used.

Flow direction in the separator reactor system may affect composition in the reactor during the run and, consequently, the product composition. But for the most part, the effect of flow direction on the alcohol to water ratio or on production rates is small. Therefore, up-flow or down-flow may be used in the process of this invention.

The present invention is specifically described with reference to FIG. 1. Olefin feed enters through line 11 and is compressed by means of high pressure pump 12. Water feed enters through line 13 and is compressed by means of high pressure pump 14. The olefin-water mixture is then passed through line 15 under pressure, through heat exchanger 16 and heater 17, so that the mixture will be at the desired temperature upon entering reactor 18 through line 19. After reaction the product is drawn off at the top of reactor 18 through line 20 and is fed through heat exchanger 16 in order to cool the product. The product is then fed through line 21 to separating zone 22 where the product separates into two phases. The lower aqueous phase is drawn off at the bottom of separator 22 through line 23 and recycled to line 15 by means of recycle pump 24. The upper organic phase is drawn off at the top of separator 22 through line 25 and depressured by means of pressure release valve 26. The depressured product is fed by line 27 to olefin flash zone 28, where the unconverted olefin is recovered and recycled by line 29 back to olefin feed line 11. The remaining portion of the organic phase, i.e. the alcohol-rich portion, is drawn off at the bottom of olefin flash zone 28 through line 30 and fed to a purification zone (not shown) where the alcohol may be purified by such means as distillation, adsorption, extraction, etc.

EXAMPLE

An experimental set-up as shown in FIG. 2 was used. Water and polymerization grade propylene feed entered through lines 111 and 112 respectively. High pressure pumps 113 and 114 were used to provide the necessary high pressure conditions for the feed. The water and propylene mixture was then passed through line 115 under pressure. The pressure was measured by high pressure gauge 116. The mixture then passed by lines 117 and 118 into reactor 120. The reactor had a 200 milliliter capacity and was stainless steel. It was provided with heater jacket 121 controlled by thermo-couples 124, 124a and 124b. Temperatures in the reactor were taken by thermo-couples in the thermo-couple well 119. The reactor was filled by placing glass wool 122a at the bottom (5 inches) followed by catalyst 123 (13 inches) and then placing glass wool 122 (1.5 inches) onto the catalyst. The catalyst was silica-alumina, ground and sieved to 20–40 mesh size.

Separator 128 was a 100 milliliter stainless steel vessel electrically heated by heater jacket 129. Temperatures were taken by thermo-couple well 130. The effluent from the reactor entered about ⅓ of the distance from the bottom of the separator, while recycle was withdrawn from the bottom of the separator through line 131. A diaphragm-type pump 132 was used for recycling. The recycle was then passed through line 131a, provided with check valve 133, then through line 131b where it was fed back into line 118 and hence into reactor 120. The product from the separator passed through line 134, provided with pressure gauge 135 passing through pressure release valve 136 while undergoing depressurization. By means of line 134a, the depressured product was passed into calibrated centrifuge tube 137 which served as the liquid receiver, while the gas passed to a wet test meter (not shown) by means of line 138.

In the run of this example the reactor solution contained isopropyl alcohol to permit rapid approach to steady state composition. Heat was then turned on to the reactor and the recycle pump 132 started. While bringing up the temperature, the pressure was kept at 2,000 p.s.i.g. Upon reaching about 400° F. reactor temperature, the feed pumps 113 and 114, previously brought to the reactor pressure, were started. The pressure was then permitted to rise to the operating pressure of about 6,750 p.s.i.g. at a temperature of about 485° F. After temperature and pressure were stabilized, product cuts were taken every half hour.

The run was ended by turning off heaters and pumps and isolating reactor from pumps. The reactor was depressured to 4,000 p.s.i., and an air stream was turned on to cool the reactor rapidly. Depressuring was continued through valve 36 to 0 gauge pressure and the reactor was drained. The product was drained off at the bottom of reactor 120 through line 125 and fed to separator 128 through line 125a. Line 125 was provided with drain valve 126 leading to drain through line 127, for ease of draining the reactor after a run. A catalyst was removed from the reactor, heated to 100° C. under vacuum, and the product was collected in a liquid nitrogen-cooled trap. Gas chromatographic analyses were made on all recovered liquid products.

The following table summarizes the results of the run:

TABLE

| | |
|---|---|
| Catalyst, silica-alumina (grams) | 60 |
| Temperature, ° F.: | |
|     Reactor | 495 |
|     Separator | 180 |
| WHSV: | |
|     Propylene | 0.29 |
|     Water | .034 |
| Propylene rate, moles per hour | 0.41 |
| Water recycle rate, cc./hr. | 170 |
| Reactor solution: | |
|     IPA conc., weight percent | 2.5 |
| Conversion $C_3H_6$ to isopropyl alcohol, percent on total run | 27 |
| Recovery of $C_3H_6$, percent of total | 91 |
| Product withdrawal, average cc./hr. (1 atm.) | 7 |

We claim:
1. A process for the preparation of $C_3$ to $C_6$ alcohols from the corresponding olefin hydrocarbons which comprises:
   (a) catalytically hydrating in a catalytic zone a wholly liquid phase water-olefin mixture in the mole ratio of between 0.25 and 25 moles of water per mole of olefin, at a temperature in the range of 200 to 500° F. and at a pressure in the range of from 2,000 to 100,000 p.s.i. so as to form a product comprising a water-rich phase and an organic-rich phase; and
   (b) recycling under said high pressure conditions said water-rich phase back into said catalytic zone.

2. A process for the preparation of $C_3$ to $C_6$ alcohols from the corresponding olefin hydrocarbons which comprises:
   (a) catalytically hydrating in a catalytic zone a wholly liquid phase water-olefin mixture in the mole ratio of between 0.25 and 25 moles of water per mole of olefin, at a temperature in the range of 200 to 550° F. and a pressure in the range of 2,000 to 100,000 p.s.i. so as to form a product consisting of an alcohol-rich phase and a water-rich phase;
   (b) removing said product to a separation zone, said separation zone maintained at a pressure in the range of 2,000 to 100,000 p.s.i. and a temperature no greater than the temperature of said catalytic zone;
   (c) removing said water-rich phase from said separation zone and recycling said water-rich phase to said catalytic zone while maintaining pressure in the range of 2,000 to 100,000 p.s.i.; and
   (d) purifying the alcohol in said alcohol-rich phase.

3. The process of claim 2 wherein said catalytic zone comprises a silica-alumina catalyst.

4. The process of claim 3 wherein said silica alumina catalyst comprises 10 to 30 percent alumina and 90 to 70 percent silica by weight in substantially uniform composition.

5. A process for the preparation of $C_3$ to $C_6$ alcohols from the corresponding olefin hydrocarbons which comprises:
   (a) contacting in a catalytic zone a wholly liquid phase water-olefin mixture, in the mole ratio of between 0.25 and 25 moles of water per mole of olefin, at a temperature in the range of 200 to 550° F. and a pressure in the range of 2,000 to 100,000 p.s.i. with a silica-alumina catalyst, at a weight hourly space velocity of 0.1 to 20 parts of said water-olefin mixture per part of catalyst by weight so as to form a product consisting of an organic-rich phase and an aqueous-rich phase;
   (b) removing and passing said product from said catalytic zone to a separation zone, said separation zone being maintained at a pressure in the range of 2,000 to 100,000 p.s.i. and at a temperature no greater than the temperature of said catalytic zone;
   (c) allowing the product to form an upper organic-rich phase and a lower aqueous-rich phase in said separation zone;
   (d) removing and recycling said lower phase back to said catalytic zone while maintaining the pressure in the range of 2,000 to 100,000 p.s.i.;
   (e) drawing off and depressuring said upper phase;
   (f) transferring said depressured upper phase to a flash zone;
   (g) removing unconverted olefin from said flash zone;
   (h) compressing and heating said unconverted olefin during recycle to said catalytic zone; and
   (i) removing alcohol from said flash zone.

6. The process of claim 5 wherein said olefin is propylene and said alcohol is isopropyl alcohol.

7. The process of claim 5 wherein said upper phase is depressured to a pressure in the range of 0 to 50 atmospheres.

References Cited
UNITED STATES PATENTS

| | | | |
|---|---|---|---|
| 2,140,694 | 12/1938 | Evans | 260—643D |
| 2,648,711 | 8/1953 | Carrier | 260—641 |
| 2,663,744 | 12/1953 | Lukasiewicz et al. | 260—641 |
| 2,797,247 | 6/1957 | Keith | 260—641 |
| 2,803,667 | 8/1957 | Chambers | 260—641 |
| 2,807,652 | 9/1957 | Carrier | 260—641 |
| 2,830,090 | 4/1958 | Teter et al. | 260—641 |
| 3,328,471 | 6/1967 | Kronig et al. | 260—641 |

FOREIGN PATENTS

| | | | |
|---|---|---|---|
| 1,350,198 | 12/1963 | France | 260—641 |

LEON ZITVER, Primary Examiner

J. E. EVANS, Assistant Examiner